(12) United States Patent
Okamura et al.

(10) Patent No.: US 6,404,170 B2
(45) Date of Patent: Jun. 11, 2002

(54) ELECTRICAL STORAGE CAPACITOR SYSTEM HAVING INITIALIZING FUNCTION

(75) Inventors: Michio Okamura, Kanagawa; Akinori Mogami, Tokyo, both of (JP)

(73) Assignees: JEOL, Ltd., Tokyo; Okamura Laboratory, Inc.; Kabushiki Kaisha Powersystems, both of Kanagawa, all of (JP)

( * ) Notice: Subject to any disclaimer, the term of this patent is extended or adjusted under 35 U.S.C. 154(b) by 0 days.

(21) Appl. No.: 09/750,451

(22) Filed: Dec. 28, 2000

(30) Foreign Application Priority Data

Dec. 28, 1999 (JP) .............................. 11-371996

(51) Int. Cl.[7] .................................................. H02J 7/00
(52) U.S. Cl. ...................................... 320/166; 320/122
(58) Field of Search ................................ 320/166, 122, 320/116, 118, 120, 167

(56) References Cited

U.S. PATENT DOCUMENTS

| | | | | |
|---|---|---|---|---|
| 4,238,721 A | * | 12/1980 | DeLuca et al. ............. | 320/122 |
| 5,578,914 A | * | 11/1996 | Morita ....................... | 320/122 |
| 5,675,233 A | * | 10/1997 | Kaneko et al. ............. | 320/122 |
| 5,969,505 A | | 10/1999 | Okamura .................... | 320/122 |
| 6,133,710 A | * | 10/2000 | Okamura .................... | 320/122 |
| 6,225,781 B1 | * | 5/2001 | Okamura et al. ........... | 320/122 |

* cited by examiner

*Primary Examiner*—Peter S. Wong
*Assistant Examiner*—Lawrence Luk
(74) *Attorney, Agent, or Firm*—Webb Ziesenheim Logsdon Orkin & Hanson, P.C.

(57) ABSTRACT

An electrical storage capacitor system that efficiently initializes itself to its initial state during pause intervals between charging/discharging cycles of operation without providing any special initializing cycles. The capacitor system comprises capacitors connected in series to store electricity, a variation decision means for judging the amount of variation in amount of charge between the capacitors, an operation decision means for judging whether the capacitors are being charged or discharged, and a initializing charging means for charging the capacitors to initialize themselves to their initial state according to the results of decisions made by the variation decision means and by the operation decision means.

10 Claims, 6 Drawing Sheets

ELECTRICAL STORAGE CAPACITOR SYSTEM HAVING INITIALIZING FUNCTION

FIELD OF THE INVENTION

The present invention relates an electrical storage capacitor system consisting of capacitors connected in series.

DESCRIPTION OF THE PRIOR ART

Where large-capacity capacitors are combined to constitute an electrical storage unit, if the capacitors are connected in series, uniform voltage must be assigned to the capacitors. We have already proposed an electrical storage system, referred to as an energy capacitor system (ECS), using electric double-layer capacitors. In this energy capacitor system, parallel monitors for monitoring and controlling voltages are connected with the capacitors connected in series. This permits maximum charging within the range of breakdown voltages of the capacitors.

FIG. 8 shows an example of the circuit configuration of such a parallel monitor. FIGS. 9a and 9b are graphs illustrating the charging/discharging characteristics of the prior art circuit shown in FIG. 8 when and after the circuit is initialized to its initial state.

In a parallel monitor, as shown in FIG. 8, a comparator CMP compares the voltage developed across a capacitor C with a reference voltage Vr. If this compared voltage reaches a set value determined by the reference voltage Vr, a transistor Tr is turned on, thus bypassing a charging current. As the charging operation progresses, the voltage developed across the capacitor C rises but is then kept at the set value as indicated by (1) in FIG. 9a. With respect to other series connected capacitors having larger capacitance, the voltages rise more slowly and reach full charge at point (2). After reaching full charge, relaxation charging is performed with a constant voltage until a next discharging (3) is commenced.

In this way, the prior art energy capacitor system (ECS) is initialized to its initial state such that the voltages developed across the capacitors become equal to the upper limit of voltage (full charge voltage) at point (1). Then, each capacitor is started to be discharged and charged from this initial state.

The above-described structure is simple and economical to realize. Also, the operation is reliable. Therefore, this structure has played a great role in putting the energy capacitor system into practical use. However, during the period (1) to (2), while the parallel monitor is turned on the charging current is bypassed by at least one capacitor. During this period, the charging energy is wasted as heat, thus constituting a problem. In particular, in the parallel monitor shown in FIG. 8, the transistor Tr is driven into conduction when the set voltage at (1) is reached. This forms a bypass circuit. The voltage is clamped to prevent the voltage from rising further. Therefore, the bypass circuit generates loss, or heat, corresponding to the charging current×full charge voltage.

The heat generated during the period (1) to (2) is produced every charging/discharging cycle if the device is a secondary battery. On the other hand, a capacitor produces heat only once on initializing. After the initializing, the voltage varies from the set, full charge voltage, and discharging is done downwardly as indicated by (4). If charging is resumed, all the capacitors are almost simultaneously fully charged again with the original voltage (5) and so little bypass current flows. Strictly speaking, the capacitors reach full charge with slight time differences because of slight characteristic variations and leakage currents during use. During the slight time differences, a bypass current flows. Consequently, loss takes place after the initializing operation for initializing the system to its initial state.

On the other hand, where capacitors connected in series and having no parallel monitors are charged, the voltage developed across each capacitor varies as indicated by FIG. 9b. That is, when the charging operation is stopped, the voltage developed across a lower capacitance capacitor shows a higher value. Variations in capacitance among the individual capacitors result in different terminal voltages among the capacitors. Furthermore, terminal voltage differences among the capacitors produced when charging may result from different residual voltages of the capacitors when the charging is stopped.

In the energy capacitor system (ECS), the terminal voltages of the capacitors are all set to the upper limit value at instant (2). That is, the terminal voltages of the capacitors are clamped to the upper limit value to initialize themselves into their initial state. Once this initializing operation is done, all the capacitors can be charged and discharged from the upper limit value with uniformly assigned voltage.

SUMMARY OF THE INVENTION

It is an object of the present invention to provide an electrical storage capacitor system which is equipped with parallel monitors having an excellent initializing function and which can efficiently initialize itself to its initial state during periods other than the charging/discharging cycles normally used without providing any special initializing cycles.

To achieve this object, the invention provides an electrical storage capacitor system having capacitors connected in series to store electricity, the capacitor system being characterized by having a variation decision means, an operation decision means, and an initializing charging means. The variation decision means judges variations in amount of charge among the capacitors. The operation decision means judges whether the capacitors are being charged or discharged. The initializing charging means charges the capacitors to return them to their initial state according to the results of the decisions made by the variation decision means and by the operation decision means.

The variation decision means judges variations in amount of charge among the capacitors according to the full charge voltage obtained when any of the capacitors reaches a given charge voltage as a result of charging.

The operation decision means can make a decision whether the capacitors are being charged or discharged with a large current. In addition, the operation decision means can make a decision as to whether the charge level is within a given tolerable level.

Other objects and features of the invention will appear in the course of the description thereof, which follows.

DESCRIPTION OF THE PREFERRED EMBODIMENTS

Figure 1:
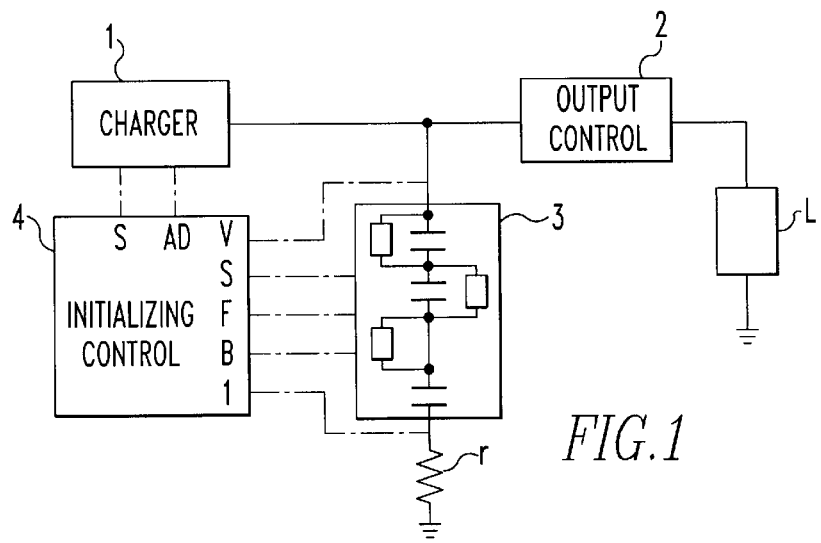
FIG. 1 is a block diagram of an electrical storage capacitor system having an initializing function in accordance with an embodiment of the present invention.
Figure 2:
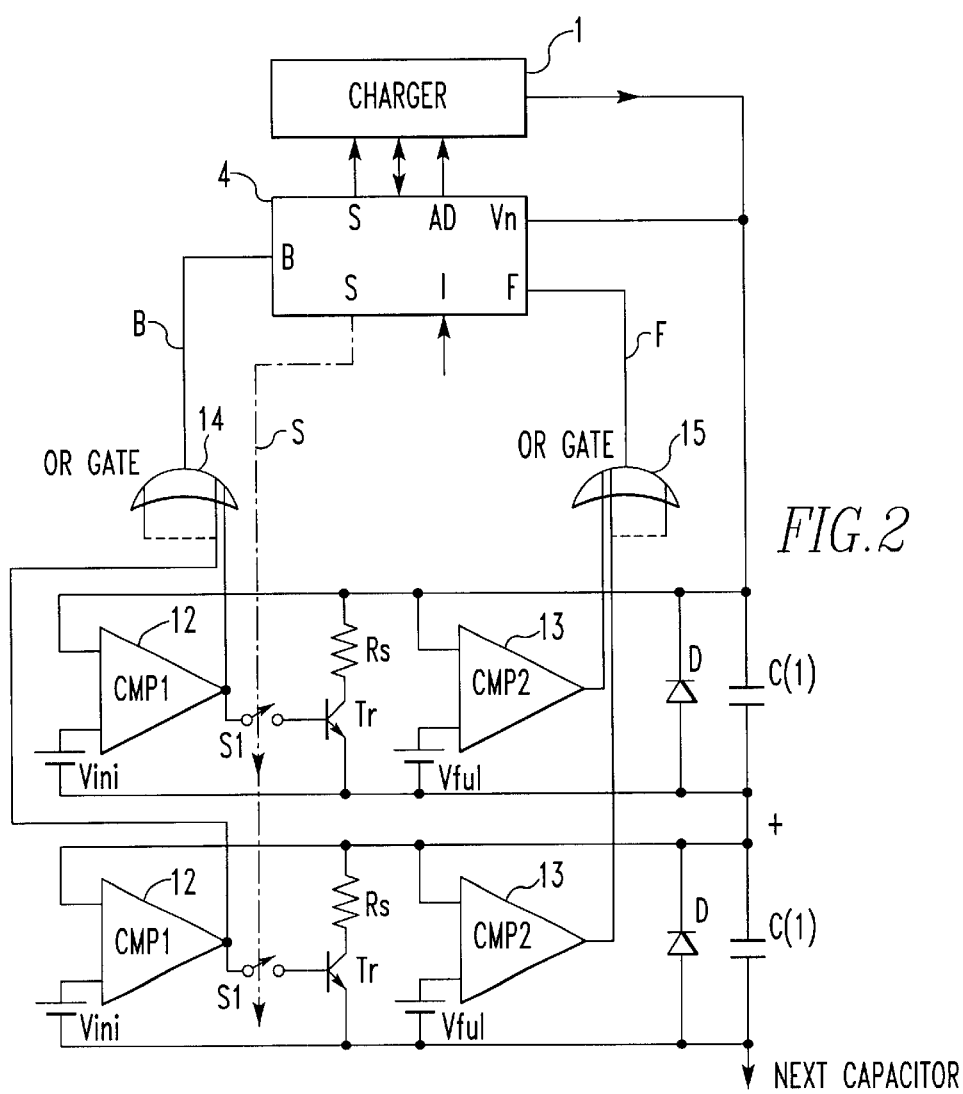
FIG. 2 is a circuit diagram of an electrical storage capacitor portion having comparators used for initializing operation and detection of full charge, respectively.

The preferred embodiments of the present invention are hereinafter described with reference to the accompanying drawings. FIG. 1 shows an electrical storage capacitor system having a initializing function in accordance with an embodiment of the present invention. FIG. 2 is a diagram showing an example of an electrical storage capacitor portion having comparators used for initializing operation and for detection of full charge, respectively. Shown in these figures are charger 1, an output control portion 2, an electrical storage capacitor portion, indicated by numeral 3, an initializing control portion 4, a resistor r used for detection of charging/discharging current, comparators 12, 13, OR gates 14, 15, capacitors C, diodes D, resistors Rs, transistors Tr, and initializing switches S1. A reference voltage for charging is indicated by Vful. A reference voltage for initializing the capacitor system to its initial state is indicated by Vini.

In FIG. 1, the electrical storage capacitor portion 3 comprises plural (for example, n) electric double-layer capacitors connected in series and parallel monitors connected in parallel with the capacitors, respectively. The charger 1 has a current source for charging the electrical storage capacitor portion 3. The output control portion 2 controls the output when a load L is fed from the electrical storage capacitor portion 3 that has been electrically charged. The initializing charging control portion 4 controls the charger 1 to gradually adjust or reduce variations in terminal voltage among the capacitors constituting the electrical storage capacitor portion 3 by initializing the capacitors to their initial state during times other than the charging/discharging cycles normally used and without providing any special initializing cycles. The initializing charging control portion 4 judges variations in terminal voltage among the capacitors and makes a decision as to whether initializing charging is necessary. The initializing charging control portion 4 judges whether the capacitors connected in series are being charged or discharged and controls the charger 1 based on the results of the judgments on the variations and on the charging/discharging operation, thus initializing the capacitors to their initial state.

The initializing charging control portion 4 reads an output voltage Vn from the electrical storage capacitor portion 3, a charging/discharging current I, a full charge signal F from the electrical storage capacitor portion 3, and a bypass operating signal B for the parallel monitors, produces a initializing signal S for starting a initializing operation in response to these signals, and supplies the initializing signal to the electrical storage capacitor portion 3 and to the charger 1.

The initializing control portion 4 supplies a signal AD for adjusting the charging current to the charger 1 as the need arises.

The charger 1 performs a charging operation (hereinafter referred to as the initializing charging operation) in response to the initializing signal S only to initialize the capacitors to their initial state. During this initializing charging operation, the charging current is preferably decreased to suppress the amount of heat generated. Where the initializing charging operation persists for a long time, the initializing charging operation may be stopped after a lapse of a given time. The initializing charging operation may be repeated intermittently. This control operation may be performed by the initializing control portion 4 or by the charger 1. Where the initializing control portion 4 performs the control operation, the initializing signal S may be halted after a lapse of a given time or may be generated repeatedly at appropriate time intervals. Where the charger 1 performs this control operation, if ON state of the initializing signal S persists for a long time, the charger 1 may turn on and off the charging current at regular intervals.

In the electrical storage capacitor portion 3, parallel monitors having comparators 12 and 13 used for initializing operation and detection of full charge, respectively, are connected in parallel with the capacitors, for example, as shown in FIG. 2. In FIG. 2, each comparator 12 used for initializing operation activates a transistor Tr connected in parallel with a capacitor C to bypass the charging current when the voltage developed across the capacitor C reaches a first reference voltage Vini.

Each comparator 13 used for detection of full charge is supplied with a second reference voltage Vful as a reference voltage, the second set voltage Vful being higher than the first reference voltage Vini. The comparator 13 acts as a voltage detection means for sensing that the voltage developed across the capacitor C becomes coincident with the second reference voltage Vful. Each transistor Tr is turned on when the voltage across the capacitor C exceeds the reference voltage Vini when the capacitor is initialized to its initial state. Thus, a bypass circuit for the charging current is formed. The resistors Rs limit the bypassing current. That is, some of the charging current is bypassed by the presence of the resistors Rs. The amount of the bypassed current is determined by the value of the resistors Rs. Each initializing switch S1 is connected between the output of the comparator 12 and the base of the transistor Tr and enables and disables the operation for initializing the capacitor C to its initial state. The initializing switches are closed when a initializing mode is selected.

The initializing control portion 4 controls charging of plural capacitors C connected in series and stops the charging if full charge voltage is detected from any capacitor C. When initializing charging is performed, the initializing control portion 4 turns on the initializing switches S1, thus starting the charging operation. The outputs from the comparators 12 for initializing the capacitors, respectively, are passed to the OR gate 14, which performs a logical OR operation and produces the bypass operating signal B as an output signal. The initializing control portion 4 judges which of the capacitors has started to bypass the charging current, based on the bypass operating signal B from the OR gate 14.

The outputs from the comparators 13 used for detection of full charge are passed to the OR gate 15, which produces an full charge signal F. The initializing control portion 4 judges which of the capacitors has been fully charged, based on the full charge signal F from the OR gate 15, and ends the charging operation.

The reference voltage Vful is set to the full charge voltage of the capacitor. The reference voltage Vini is set to a voltage lower than the reference voltage Vful. When a charging operation is performed while the initializing switches S1 are closed, the transistors Tr for the capacitors having terminal voltages which reach the reference voltage Vini earlier are turned on earlier. Some of the charging current is bypassed, thus reducing the charging speed. When any of the capacitor is fully charged, the charging operation from the current source by the charger 1 is stopped. If necessary, relaxation charging is done.

Figure 3A:
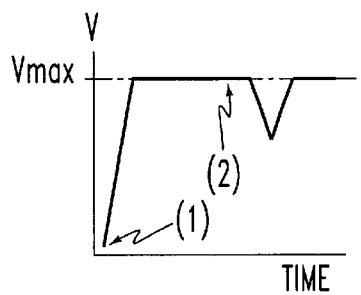
FIGS. 3(A)–(C) are graphs showing methods of charging and discharging capacitors and some instants of time at which an initializing operation can be performed.
Figure 3B:
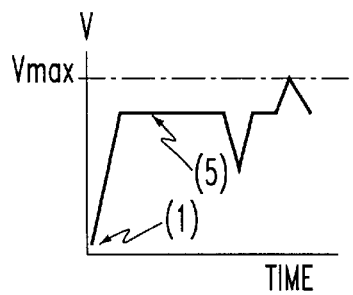
Figure 3C:
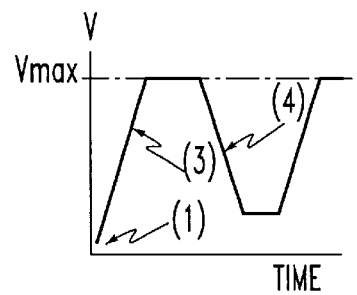
Figure 4:
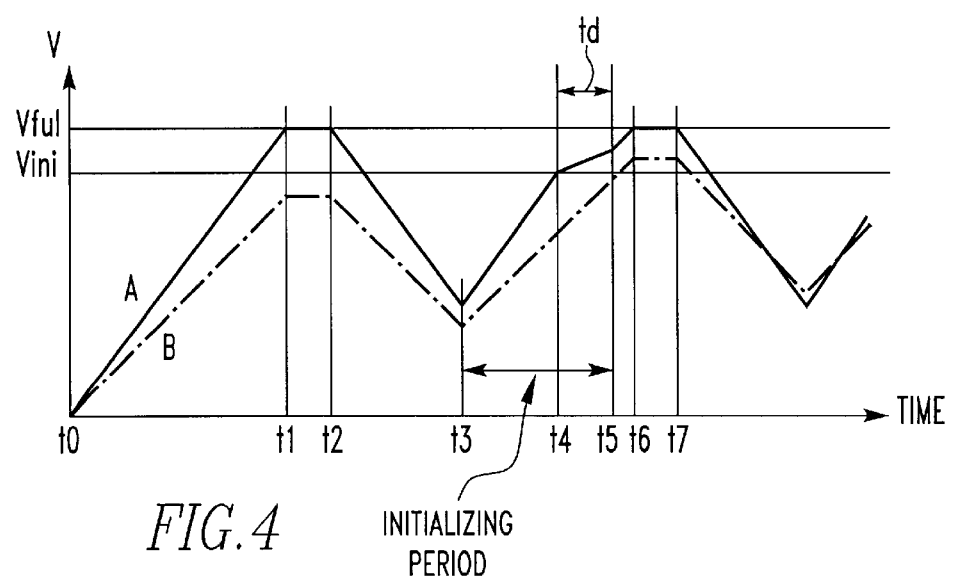
FIG. 4 is a graph showing examples of charging/discharging characteristic curves of an electrical storage capacitor system having an initializing function in accordance with the invention.

The charging and discharging operation and the initializing charging operation in accordance with the present invention are next described. FIGS. 3(A)–(C) are graphs showing methods of charging and discharging capacitors and examples of instants of time at which an initializing operation can be started. FIG. 4 is a graph showing examples of charging/discharging characteristic curves of an electrical storage capacitor system in accordance with the invention.

Figure 8:
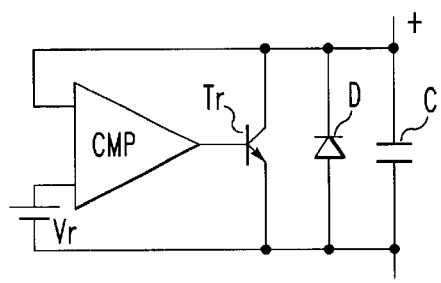
FIG. 8 is a circuit diagram of a prior art parallel monitor.
Figure 9A:
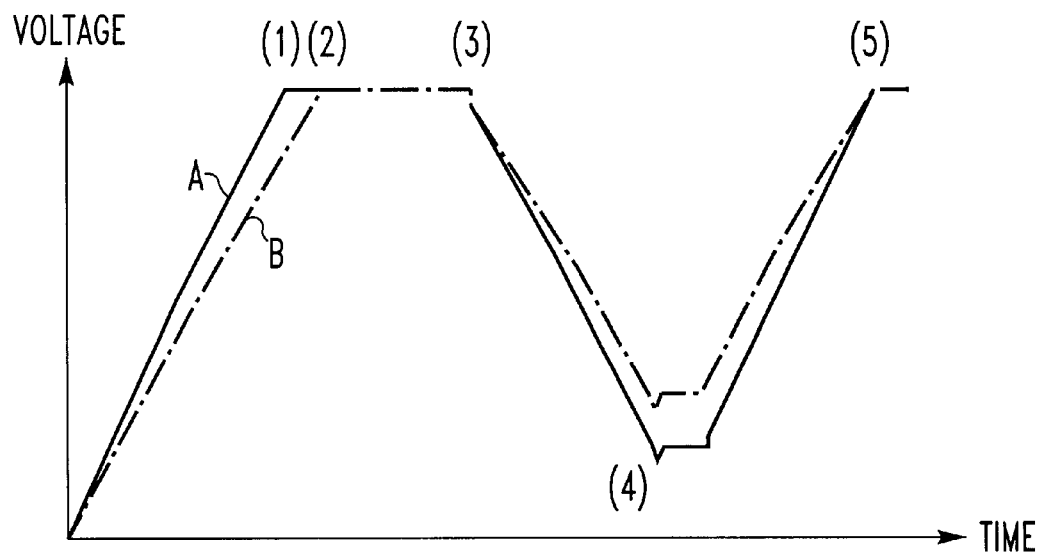
FIG. 9(A) is a graph showing the charging/discharging waveform of a capacitor equipped with a prior art parallel monitor.
Figure 9B:
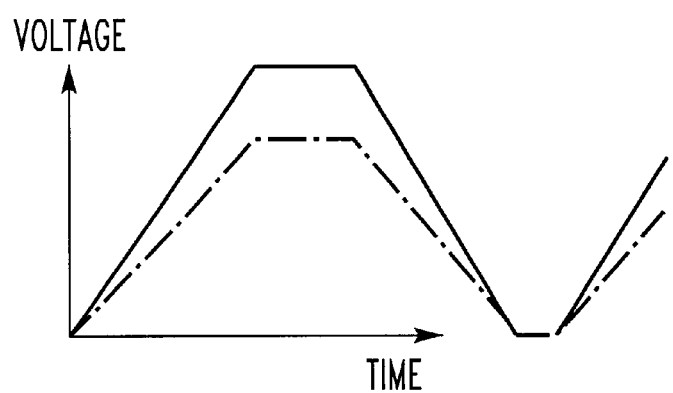
FIG. 9(B) is a graph showing the charging/discharging waveform of a capacitor equipped with no parallel monitor.

In FIGS. 3(A)–(C), instants of time at which the electrical storage capacitor system can be initialized to its initial state are shown on the charging/discharge characteristic curves as follows: (1) indicates a case in which the capacitor system is initialized to its initial state by making use of diodes connected in parallel with the capacitors when the terminal voltage is close to zero, (2) indicates a case in which the capacitor system is initialized to its initial state on full charge with one comparator as described already in connection with FIGS. 8, 9(A) and 9(B), (3) indicates a case in which the capacitor system is gradually initialized to its initial state during charging while the system is in use, (4) indicates a case in which the capacitor system is initialized to its initial state during discharge while the system is in use, and (5) indicates a case in which the capacitor system is initialized to its initial state when the system is not charged nor discharged while the system is in use.

In this way, some instants of time exist at which an initializing operation for initializing the capacitor system to its initial state is started. Generally, if the parallel monitors are so controlled that one or more of the methods (1)–(5) described above can be implemented, then the capacitor system can cope with various applications and operating conditions including an interruptible power supply used for a personal computer and making preparations for blackout always in a fully charged state, an interruptible power supply for improving the voltage variation rate at 80% state-of-charge and coping with small amounts of electric power going in and out and standby condition for blackout, and an all-night light using solar cells and always in charging/discharging cycles.

In the present invention, each parallel monitor is equipped with comparators used respectively for an initializing operation and detection of full charge as shown in FIG. 2. When the charging system is not charged nor discharged as indicated by condition (5), an initializing operation is performed. One example of a situation in which neither charging nor discharging is effected is a state in which the capacitor system is neither charged nor discharged with large current.

An initializing operation is started when three conditions are satisfied: [1] charging/discharging with large current is not carried out; [2] the output voltage Vn from the electrical storage capacitor portion is within a given range; and [3] the amount of variation in the amount of charge among the capacitors is in excess of a given level. During charging and discharging, the voltage level varies about a control center value Vnc. The voltage Vini is set to initialize the capacitors to their initial state. The voltage Vini multiplied by the number of capacitors n connected in series, or Vini×n, is herein referred to as the total reference voltage. Taking account of errors introduced in the comparators and variations among them, the control center value Vnc is set slightly lower than the total reference voltage, Vini×n. That is, if the center voltage Vnc is not set lower than the total reference voltage, the initializing current will be wasted when the initializing operation is almost complete. If the control center voltage Vnc is set much lower than the total reference voltage, the output voltages from the capacitors will not be completely uniform on completion of the initializing operation.

The amount of variation in the amount of charge among the capacitors can be judged based on the output voltage Vn from the electrical storage capacitor portion 3 when the full charge signal F is delivered. For example, when the capacitor portion is started to be used and the initializing operation is not yet finished, the total amount of charge in the capacitors connected in series is not 100%. As the amount of variation is increased, the full charge signal F is delivered when the amount of charge is smaller. Accordingly, the amount of variation (i.e., the degree of incompleteness of the initializing operation) can be judged according to the extent to which the output voltage Vn corresponding to the total amount of charge in the capacitors connected in series is smaller than reference voltage Vful (for full charge)×n. If no variation is present, all the capacitors reach full charge voltage Vful simultaneously and so the output voltage Vn at this time becomes equal to Vful×n.

The amount of variation can also be judged from the output voltage Vn when any terminal voltage of the capacitors reaches an arbitrary voltage (e.g., reference voltage Vini). That is, the amount of variation can be judged by multiplying the output voltage Vn by factor n and comparing the resulting voltage with the original output voltage Vn.

When initializing charging is being carried out, the duration starting with the time when starting of bypassing through at least one parallel monitor is detected with the bypass operating signal B and ending with the time when the full charge signal F is detected becomes longer with increasing the amount of variation, and the amount of heat generated by the bypass transistor Tr increases. Where such generation of heat from the bypass transistor Tr is undesirable, the initializing operation may be halted after a lapse of a given time since detection of the bypass operating signal B. Thus, the transistor is allowed to cool for some time. In this way, the capacitor system may be operated intermittently. Alternatively, the charging current used only for the initializing operation may be reduced. Furthermore, the initializing control portion 4 may detect the extent of heat generated, produce the signal AD for adjusting the initializing current according to the result of the detection, and send the signal AD to the charger 1.

Where the initializing operation is performed while large-current charging/discharging operation is not being carried out as described above (especially, when the electrical storage capacitor system is used in a hybrid vehicle), if the brake pedal or the accelerator pedal is pushed down to thereby start large-current charging/discharging, the initializing conditions are no longer satisfied. Therefore, the initializing signal S is turned off. In this case, the initializing operation is not completed but interrupted. The initializing operation is resumed when the initializing conditions are satisfied next. Consequently, no practical problems take place.

It is assumed that two capacitors $C_A$ and $C_B$ ($C_A < C_B$) having different capacitances are connected in series. A case in which these two capacitors are fully discharged or initialized to their initial state at zero voltage and then they are charged from a constant current source is now discussed. When the initializing mode is not selected, i.e., the initializing switches S1 are open, the bias circuit for the charging current is not in operation. Therefore, the voltage rises from instant to at a gradient corresponding to the capacitance as shown in FIG. 4. If one (e.g., the capacitor $C_A$ having a smaller capacitance) of the capacitors connected in series first reaches the reference voltage Vful at instant $t_1$, the full charge detection signal about the comparator 13 goes high (HI). Thus, the full charge signal F from the OR gate 15 goes high (HI). The initializing control portion 4 causes the charger 1 to stop the constant-current charging. Under this condition, if the terminal voltage of the capacitor $C_A$ becomes lower than the reference voltage Vful due to self-charge of the capacitor or due to self-discharge, then the signal F goes low, restarting the charging. Therefore, relaxation charging in which the voltage is maintained constant persists after the instant $t_1$.

When discharging to the load L via the output control portion 2 is started at instant $t_2$ and stopped at instant $t_3$, if the initializing control portion 4 judges that the aforementioned three initializing conditions are satisfied, the initializing control portion 4 closes the initializing switches S1, thus starting initializing charging.

As the charging progresses, the terminal voltage of each capacitor rises. The terminal voltage of the capacitor $C_A$ having a smaller capacitance reaches the reference voltage Vini earlier at instant $t_4$. At this time, the bypass circuit for the capacitor $C_A$ is turned on. The rate of increase of the terminal voltage drops. On the other hand, the bypass circuit for the capacitor $C_B$ remains off. In consequence, the rate of increase of the terminal voltage does not change.

To prevent the bypassing transistor from generating heat, the initializing control portion 4 ceases the initializing signal S at instant $t_5$ after a lapse of a given time $t_d$ since the bypassing circuit has been turned on first.

After the initializing operation ends at the instant $t_5$, if normal electrical charging to store electricity is continued, the terminal voltage of any capacitor reaches the reference voltage Vful, or the full charge, at instant $t_6$. At this time, the signal F is generated. In response to this signal F, the initializing control portion 4 stops the charging.

The initializing control portion 4 can end the charging at the instant $t_5$ when the initializing operation ends. If the initializing charging is interrupted and discharging is done to make use of electric power, the initializing charging may be carried out again after the discharging is stopped.

If it is not necessary to take account of heat generated by the bypassing transistor, then it is not necessary to turn off the initializing signal S at the instant $t_5$, i.e., after a lapse of a given time $t_d$ since the bypassing transistor has been turned on first as mentioned previously. In this case, when the terminal voltage of any capacitor reaches the full charge voltage and the signal F is generated, the initializing control portion 4 turns off the full charge signal F, thus ending the initializing charging.

During the initializing charging, if the bypass circuit is turned on, the rate of increase of the terminal voltage of the capacitor decreases by an amount corresponding to the current flowing into the bypass circuit. If the value of the resistor Rs inserted in series with the transistor Tr is zero, then the terminal voltage does not increase above the reference voltage Vini. In this example, the value of the resistor Rs is so set that the current is roughly half bypassed to halve the rate of increase of the voltage. Thus, the terminal voltage continues to rise.

In this way, the capacitor $C_A$ reaches the reference voltage Vini at the instant $t_4$, while the capacitor $C_B$ reaches it at the later instant $t_5$. Comparison of the voltages at instants $t_1$ and $t_6$ reveals that the terminal voltage of the capacitor $C_B$ that was lower on full charge (when the charging is stopped) increases and approaches the terminal voltage of the capacitor $C_A$.

Figure 5:
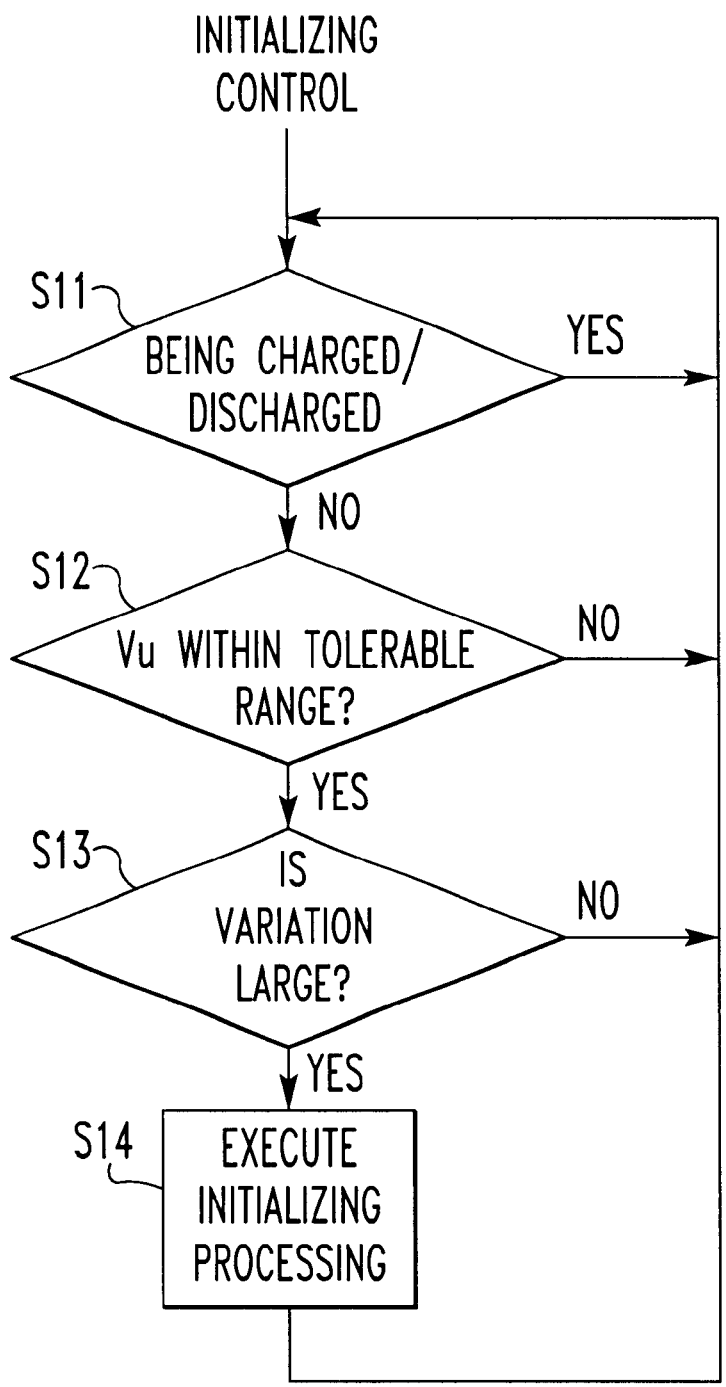
FIG. 5 is a flowchart illustrating one example of control for initializing an electrical storage capacitor system to its initial state.
Figure 6:
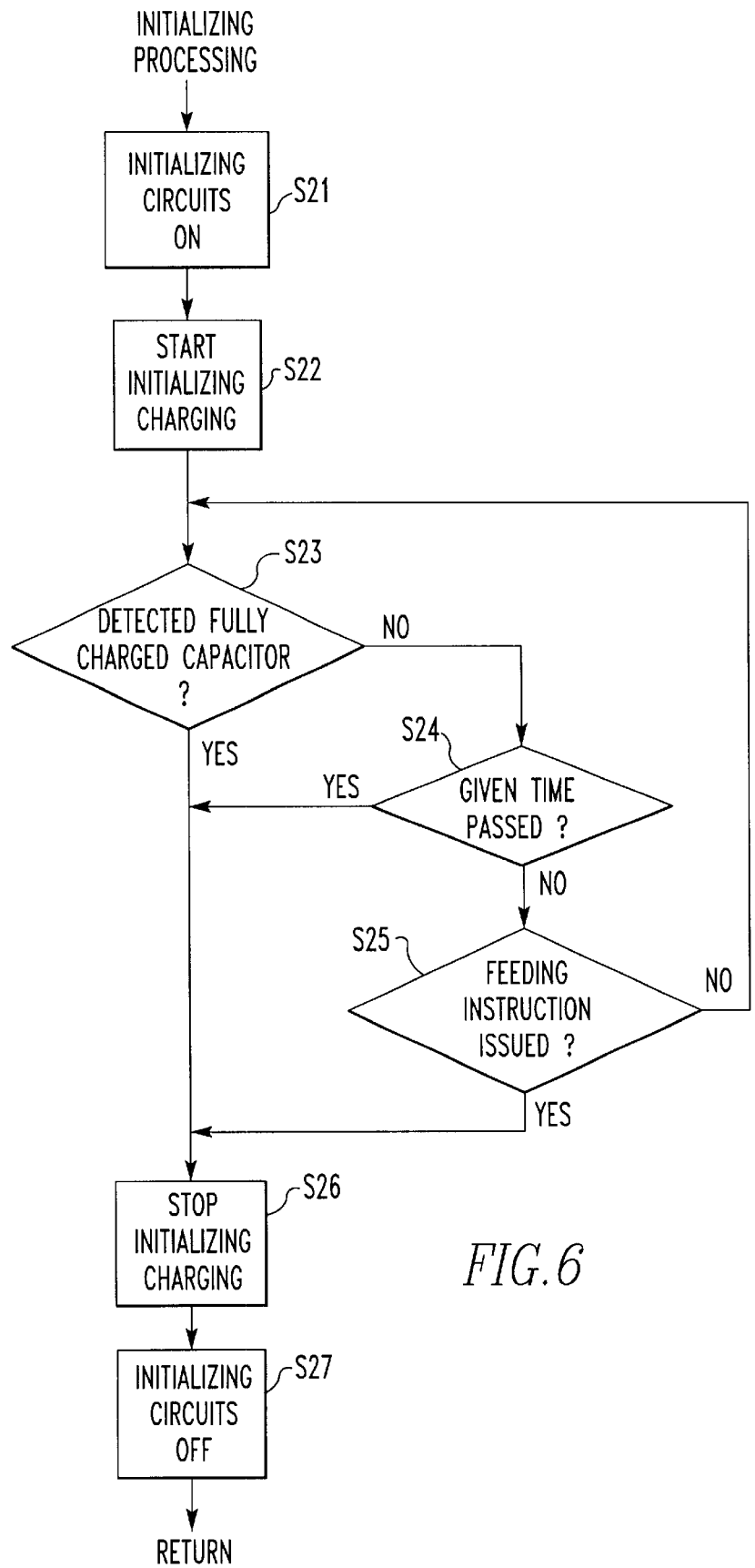
FIG. 6 is a flowchart illustrating an example of processing for initializing an electrical storage capacitor system to its initial state.
Figure 7:
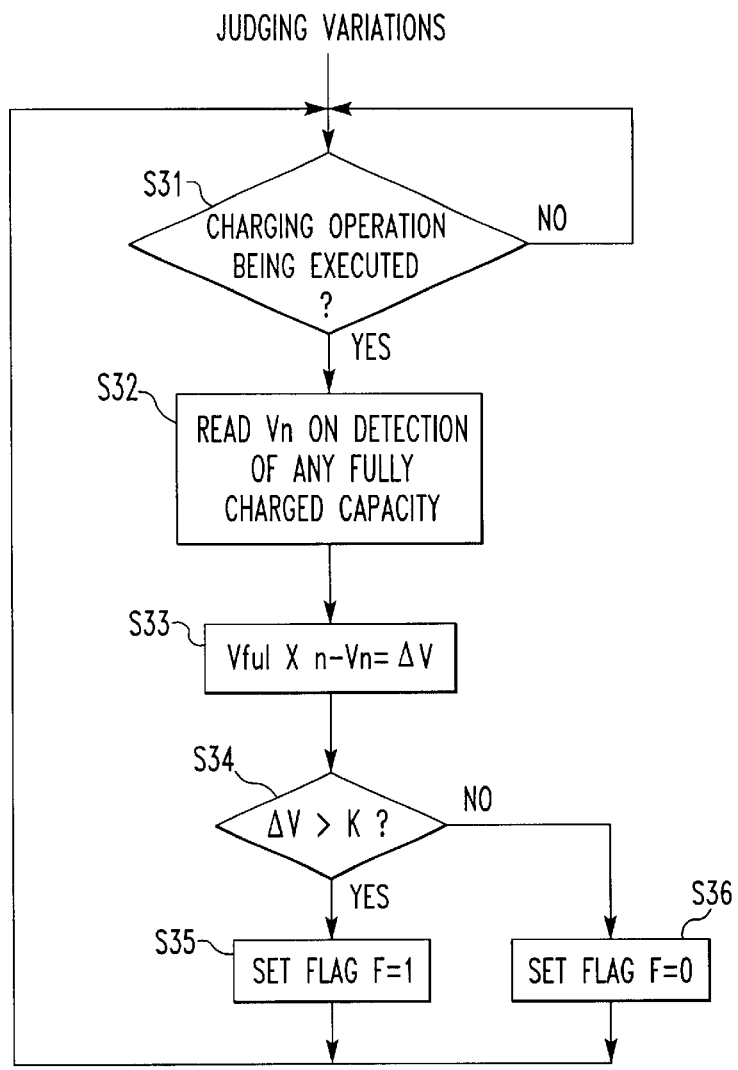
FIG. 7 is a flowchart illustrating one example of processing for judging variations in the amount of charge among capacitors.

The initializing control is next described using a specific example. FIG. 5 is a flowchart illustrating one example of processing for the initializing control. FIG. 6 is a flowchart illustrating one example of initializing processing. FIG. 7 is a flowchart illustrating one example of processing for judging variations in amount of charge among capacitors.

The initializing control operation for the electrical storage capacitor system in accordance with the present invention starts with making a decision as to whether the system is being charged or discharged (step S11 of FIG. 5). A decision is made as to whether the charge level (output voltage Vn) is within a tolerable range (step S12). A decision is made as to whether the amount of variation in amount of charge among the capacitors is large or not (step S13). If the system is neither charged nor discharged, the charge level is within the set range, and the amount of variation in the amount of charge among the capacitors is large, then the initializing processing is executed (step S14).

In the initializing processing, the initializing switches S1 are closed as illustrated in FIG. 6. The initializing circuits (comparators 12) are turned on (step S21), thus starting the initializing charging (step S22). Then, a decision is made based on the signal F as to whether any fully charged capacitor is detected (step S23). If no fully charged capacitor is detected, a decision is made based on the signal B as to whether a given time has passed since detection of a capacitor for which a bypass circuit for a parallel monitor is in operation (step S24). If the given time has not passed, a decision is made as to whether a feeding instruction for discharging to the load is issued (step S25). If no fully charged capacitor is not detected, the given time has not passed, and the feeding instruction is not issued, then control returns to the step S23, in which the same processing is repeated. On the other hand, if any fully charged capacitor is detected, the given time has passed, or the feeding instruction is issued, then the initializing charging is stopped (step S26). The initializing switches S1 are opened, thus turning off the initializing circuits (step S27).

In the processing for judging the amount of variation in amount of charge among the capacitors, a decision is first made as to whether a charging operation is being executed (step S31 of FIG. 7). The output voltage Vn on detection of any fully charged capacitor is read (step S32). The difference $\Delta V$ between Vful×n and the output voltage Vn is calculated, or (Vful×n)−Vn=$\Delta V$, (step S33). Then, a decision is made as to whether the difference $\Delta V$ is greater than a constant value K (step S34). If the difference $\Delta V$ is greater than the constant value K, a flag indicating that the amount of variation is large is set to 1 (step S35). If the difference $\Delta V$ is not greater than the constant value K, the flag is set to 0 (step S36). That is, the constant value K is a reference value based on which the amount of variation is judged to be great is not. If all the cells are charged to the reference voltage Vful, and if the amount of variation does not exist at all, then ΔV=0.

It is to be noted that the present invention is not limited to the above embodiment but rather various modifications and changes are possible. For instance, in the above embodiment, the charging/discharging current for the electrical storage capacitor portion is detected to make a decision whether it is being charged or discharged with large current, and for determining that the system is neither charged nor discharged. The decision may also be made based on a control signal for the charger or for the output control portion whether the system is being neither charged nor discharged.

If some of the numerous capacitors are at fault, the defective capacitors may be shorted out, and the whole system may be continued to be operated. This method may also be used in combination of the electrical storage capacitor system in accordance with the present invention. In this case, the number n of the capacitors connected in series is reduced by the shortening. Therefore, it is always necessary to detect the number of capacitors currently connected in series.

As can be understood from the description provided thus far, the present invention provides an electrical storage capacitor system comprising plural capacitors connected in series and acting to store electricity. This electrical storage capacitor system is characterized in that it has a variation decision means for judging the amount of variation in amount of charge among the capacitors, an operation decision means for judging whether the capacitors are being charged or discharged, and a initializing charging means for charging the capacitors to initialize them to their initial state according to the results of decisions made by the variation decision means and by the operation decision means. Consequently, the capacitor system can be initialized to its initial state quickly and precisely with relatively simple control without providing any special initializing cycles.

Having thus described our invention with the detail and particularity required by the Patent Laws, what is desired protected by Letters Patent is set forth in the following claims.

What is claimed is:

1. An electrical storage capacitor system having an initializing function, said electrical storage capacitor system comprising:

plural capacitors connected in series and acting to store electricity;

a variation decision means for judging an amount of variation in amount of charge among said capacitors;

an operation decision means for judging whether said capacitors are being charged or discharged; and an initializing charging means for charging said capacitors to initialize them to their initial state according to results of decisions made by said variation decision means and by said operation decision means.

2. An electrical storage capacitor system having an initializing function as set forth in claim 1, wherein said variation decision means judges the amount of variation according to a terminal voltage of the capacitors connected in series when any one of the capacitors reaches a given terminal voltage as a result of charging.

3. An electrical storage capacitor system having an initializing function as set forth in claim 1, wherein said operation decision means judges whether the capacitors are being charged or discharged with large current.

4. An electrical storage capacitor system having an initializing function as set forth in claim 1, wherein said operation decision means makes a decision as to whether a charge level of the capacitors connected in series is within a given tolerable range.

5. An electrical storage capacitor system having an initializing function as set forth in claim 1, wherein said initializing charging means comprises parallel monitors for causing a charging current to bypass said capacitors, respectively, at a first set voltage and voltage detection means for detecting a second set voltage used to judge that an initializing operation has ended, said second set voltage being higher than said first set voltage.

6. An electrical storage capacitor system having an initializing function as set forth in claim 5, wherein said operation decision means makes a decision as to whether a difference ΔV between a voltage that is the product of said reference voltage (Vful) and the number of said capacitors (n) and an output voltage from said capacitors connected in series, or (Vful×n)−Vn, is within a given range.

7. An electrical storage capacitor system having an initializing function as set forth in claim 5, wherein said initializing charging means charges the capacitors in such a way that an amount of heat generated by said parallel monitors is not great.

8. An electrical storage capacitor system having an initializing function as set forth in claim 7, wherein said initializing charging means intermittently charges the capacitors to initialize them to their initial state.

9. An electrical storage capacitor system having an initializing function as set forth in claim 7, wherein said initializing charging means stops charging if an amount of heat generated by said parallel monitors becomes great.

10. An electrical storage capacitor system having an initializing function as set forth in claim 7, wherein said initializing charging means stops charging if a given time passes since some of the parallel monitors for the capacitors have started to perform a bypass operation.

* * * * *